United States Patent [19]

Kuromatsu

[11] Patent Number: 4,849,599
[45] Date of Patent: Jul. 18, 1989

[54] MACHINING METHOD EMPLOYING CUTTING OR GRINDING BY CONDUCTIVE GRINDSTONE

[76] Inventor: Akio Kuromatsu, 3285-3, Shinyoshida-machi, Kouhoku-ku, Yokohama, Kanagawa, Japan, 223

[21] Appl. No.: 834,307
[22] PCT Filed: Jun. 13, 1985
[86] PCT No.: PCT/JP85/00329
  § 371 Date: Apr. 14, 1986
  § 102(e) Date: Apr. 14, 1986
[87] PCT Pub. No.: WO86/00037
  PCT Pub. Date: Jan. 3, 1986

[30] Foreign Application Priority Data
Jun. 14, 1984 [JP] Japan ................. 59-120719
Dec. 18, 1984 [JP] Japan ................. 59-265236

[51] Int. Cl.⁴ .................. B23H 5/04; B23H 5/06; B24B 53/00
[52] U.S. Cl. .................. 219/69.17; 204/129.43; 204/129.46; 204/212; 204/224 M; 219/69.2
[58] Field of Search ........... 219/69 V, 69 M, 69 E, 219/69 R, 68; 204/129.43, 129.46, 212, 218, 224 M; 51/325, 165, 87

[56] References Cited
U.S. PATENT DOCUMENTS

| | | | |
|---|---|---|---|
| 2,905,605 | 9/1959 | Keeleric et al. | 204/129.43 |
| 4,013,526 | 3/1977 | Inoue | 204/224 M |
| 4,236,985 | 12/1980 | Grodzinsky et al. | 219/69 V |
| 4,448,656 | 5/1984 | Kuromatsu | 219/69 V |
| 4,596,066 | 6/1986 | Inoue | 219/69 E |
| 4,640,057 | 2/1987 | Salje | 51/325 |
| 4,641,007 | 2/1987 | Lach | 219/69 V |

FOREIGN PATENT DOCUMENTS

| | | | |
|---|---|---|---|
| 121293 | 10/1978 | Japan | 219/69 D |
| 601149 | 4/1978 | U.S.S.R. | 51/325 |
| 639676 | 12/1978 | U.S.S.R. | 204/224 M |
| 704746 | 12/1979 | U.S.S.R. | 219/69 V |
| 1258355 | 12/1971 | United Kingdom | 51/165.87 |

Primary Examiner—A. D. Pellinen
Assistant Examiner—Geoffrey S. Evans
Attorney, Agent, or Firm—Armstrong, Nikaido, Marmelstein, Kubovcik & Murray

[57] ABSTRACT

A method an apparatus for machining a workpiece by use of a conductive grindstone, and for dressing the grindstone simultaneously with the machining process.

8 Claims, 5 Drawing Sheets

MACHINING METHOD EMPLOYING CUTTING OR GRINDING BY CONDUCTIVE GRINDSTONE

FIELD OF THE INVENTION

Heretofore, during machining of a workpiece (an article to be machined) by means of a grinding wheel, if clogging of the grinding wheel occurs, one had to stop machining the workpiece once and then to perform dressing of the grinding wheel (repairing the grindstone in shape and sharpness).

On the contrary, this invention relates to a machining method employing cutting or grinding wherein dressing of a grindstone is performed while machining a workpiece by use of the grindstone.

Namely, according to this invention, while a workpiece is being cut or ground by use of a conductive grindstone, dressing is performed by making an electrode close to or in contact with the grindstone.

DESCRIPTION OF THE PRIOR ART

When a grinding wheel for cutting or grinding a workpiece is used for a long time, clogging occurs due to adhesion of shavings between the grains of the grinding wheel, thereby resulting in an extremely low machining efficiency. Therefore, it was necessary to stop machining from time to time and then mechanically dress the working surface of the grindstone by means of a well-known dresser. This is the case for not only normal insulating grindstones but also grindstones consisting of diamond grains or borazon grains and metallic binder and entirely conductive grindstones for use in electrolytic grinding. Particularly, if a workpiece is made of a material which is apt to incur clogging, it results in extremely lowering machining efficiency and shortening the life of the grindstone.

SUMMARY OF THE INVENTION

An object of this invention is to provide a machining method and apparatus wherein dressing can be performed while machining a workpiece.

Another object of this invention is to provide a machining method and apparatus capable of maintaining a high machining efficiency and prolonging the life of the grindstone.

DETAILED DESCRIPTION OF EMBODIMENTS OF THE INVENTION:

Embodiments of this invention will be described in connection with the accompanying drawings.

(A) Grindstone

In this invention, the following two different type grindstones can be used for machining a workpiece:

(1) Entirely conductive Grindstone

The entirely conductive grindstone means one the whole of which is conductive. All of entirely conductive grindstones publicly known, such as metal-bonded grindstones, conductivity-imparted glass-bonded or resin-bonded grindstones and electroplated grindstones can be used.

Figure 1A:
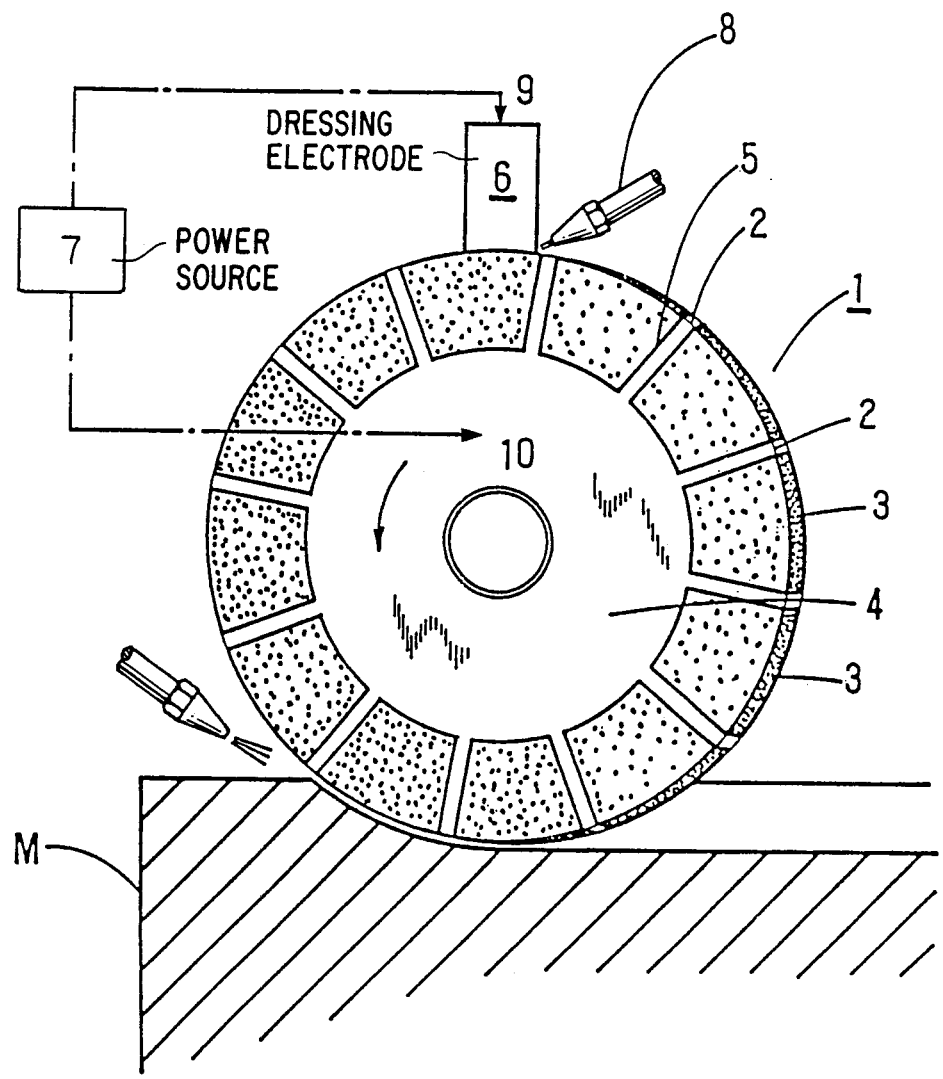
FIGS. 1a and 1b show workpieces under machining.

(2) Partially Conductive Grindstone (See FIG. 1a)

A partially conductive grindstone 1 comprises conductive zones 2 formed by a conductive element exposed to the peripheral surface of a non-conductive grindstone disk. Thus, in this type grindstone, abrasive zones 3 formed by non-conductive grindstone material exist between the conductive zones 2. Namely, in the peripheral surface of this type grindstone, conductive zones 2 and abrasive zones 3 are alternately arranged, or there are discrete conductive zones 2 surrounded by abrasive zones 3. A conductive ring 4 is provided with the grindstone 1 at its center for electrically connecting to each of the conductive zones 2 at the peripheral surface. Such electric connections can be made by providing embedded radial conductive paths 5.

Other different grindstones of this type wherein conductive zones 2 and abrasive zones 3 are alternately arranged or there are discrete conductive zones 2 within abrasive zone 3 are shown in FIGS. 2 to 5.

(B) Electrodes for Dressing

A dressing electrode 6 may be in the form of a block or a disk.

(1) Block-like Electrode

This electrode 6 may be made of any material having a good conductivity, a good wear-resistance, good arcing characteristics, a good arcing wear-resistance and a good corrosion resistance. For example, the materials include various conductive materials containing resin, glass or metal, or a mixture thereof as a binder, various alloys for an electrode such as silver-tungsten alloy and copper-tungsten alloy, graphite and a composite material of graphite and metallic powder.

(2) Disk-like Electrode

Figure 1B:
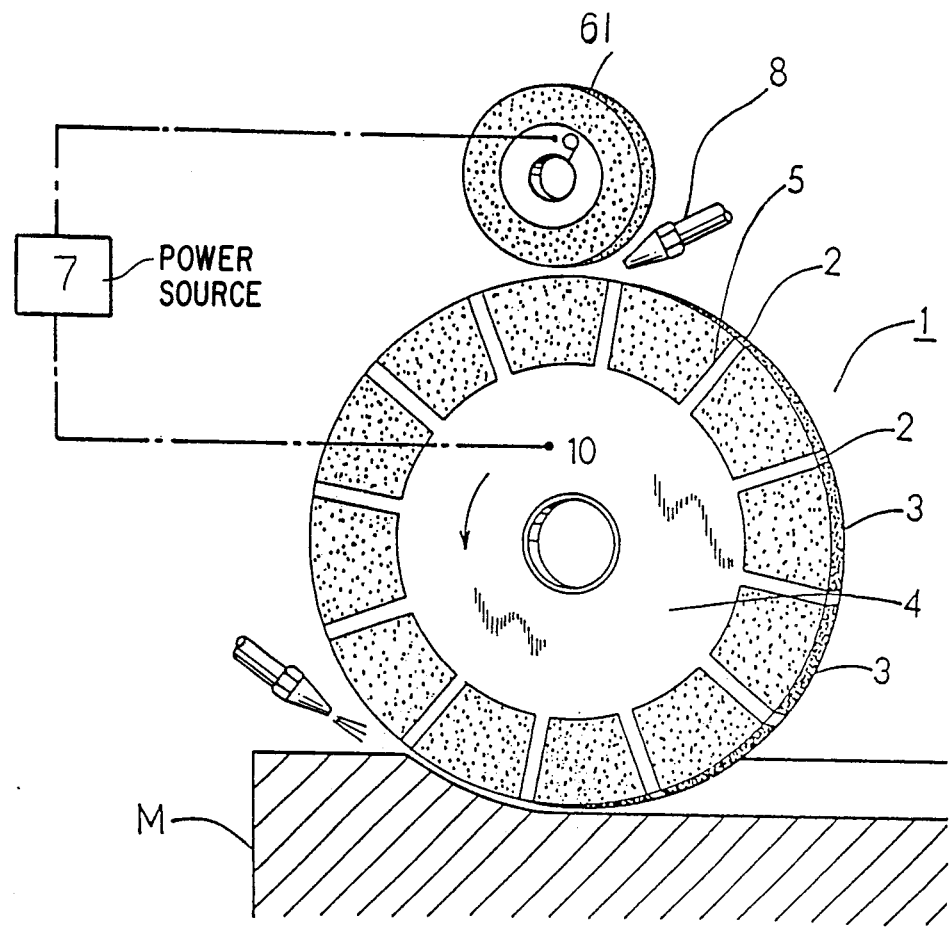
Figure 2:
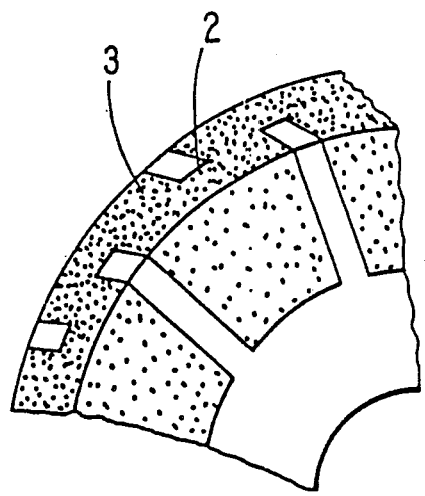
FIGS. 2 to 5 show other different grindstones.
Figure 3:
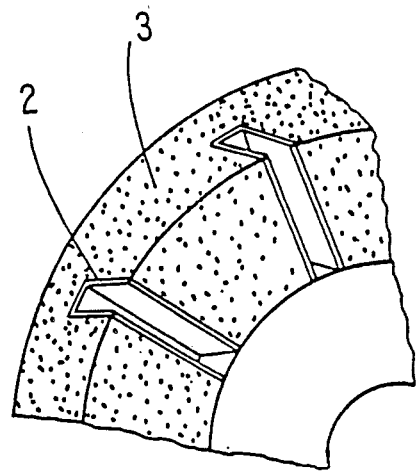
Figure 4:
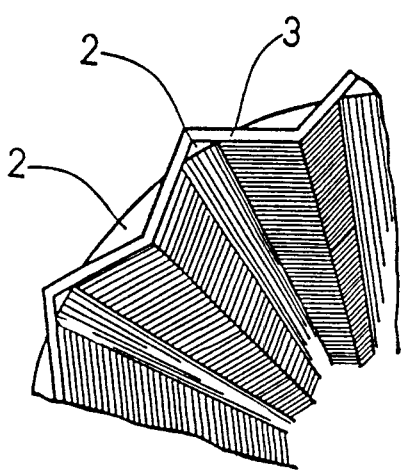
Figure 5:
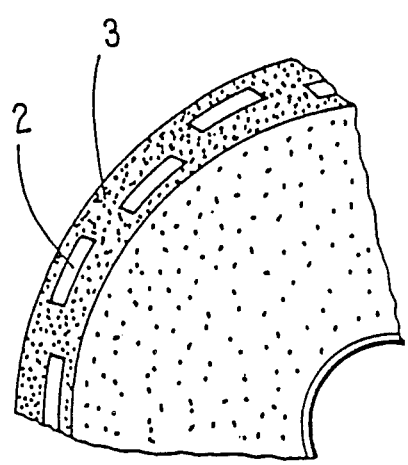

This electrode 61 can be of an entirely conductive grindstone or a partially conductive grindstone having the same structure as those used for machining a workpiece. (See FIG. 1b) For example, all of entirely conductive grindstones and partially conductive grindstones publicly known such as metal-bonded grindstones, glass-bonded grindstones and resin-bonded grindstones can be used for the disk-like electrode 61.

(C) Dressing Apparatus

Figure 6:
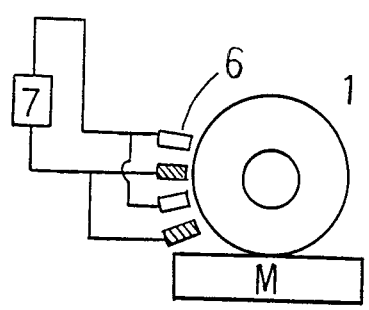
FIG. 6 shows an arrangement of dressing electrodes.

An apparatus for carrying out a machining method according to this invention comprises a part for machining a workpiece M and a part for dressing a grinding wheel 1. Particularly, the dressing part will be described in detail. A block-like (see FIG. 1a) or disk-like (see FIG. 1b) dressing electrode 6 or 61 is provided so as to be close to the peripheral surface of the grinding wheel 1. Then, the terminals 9 and 10 of a power source 7 are connected to the dressing electrode 6 or 61 and the grinding wheel respectively so that electrical conduction may be caused between the dressing electrode 6 or 61 and the peripheral surface of the grinding wheel 1. As described hereinafter, the power source 7 may be common to dressing and workpiece machining. Furthermore, a liquid supply nozzle 8 is provided for feeding a desired working liquid to the gap between the dressing electrode 6 or 61 and the grinding wheel 1. (see FIG. 1) According to another embodiment, one or more pairs of rod-like dressing electrodes 6 are provided over the peripheral surface of the grinding wheel 1 and connected to the power source 7. (see FIG. 6)

(D) Machining Apparatus

A machining apparatus according to this invention comprises two parts, a part for machining a workpiece M and a part for dressing a grindstone.

The machining apparatus of this invention may be generally classified into the following three types, dependently on whether or not a separate power source for dressing is provided.

Figure 12:
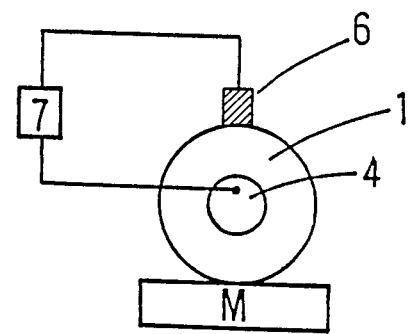
FIGS. 12 to 16 show machining apparatus of different types.

(1) Type Having Only a Power Source for Dressing, but No Power Source for Machining FIG. 12 illustrates a basic structure of an apparatus having an exclusive power source for dressing. In this type apparatus, a conductive grindstone is used, and a workpiece M is machined only by mechanical grinding and cutting.

(2) Type Having Two Power Sources, for Dressing and for Machining a Workpiece

Figure 13:
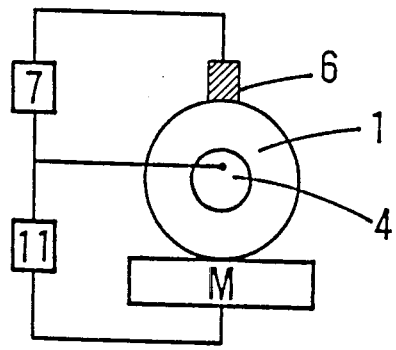

FIG. 13 illustrates a basic structure of an apparatus having a separate power source 7 for dressing and a separate power source 11 for machining a workpiece M. In this type apparatus, the workpiece M can be machined by a combination of electrolytic grinding and mechanical grinding or a combination of electrolytic discharge grinding and mechanical grinding. Since the power source 7 for dressing is provided separately from the power source 11 for machining the workpiece M, it is possible to freely select timing for dressing during machining.

(3) Type Having a Common Power Source for Dressing and Machining

Figure 14:
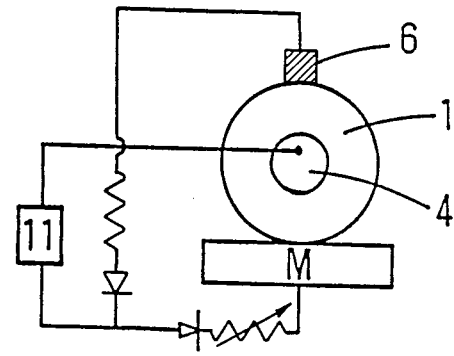
Figure 15:
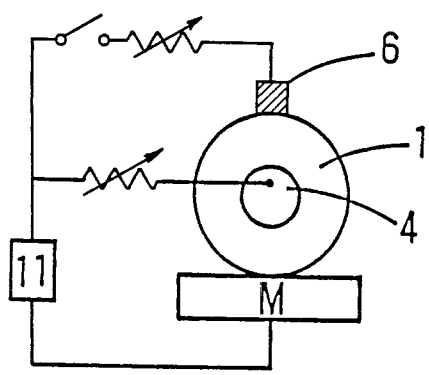
Figure 16:
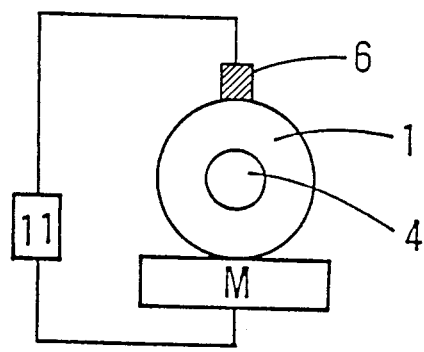

FIGS. 14 to 16 illustrate basic structures of an apparatus having a common power source which can simultaneously perform dressing and machining of the workpiece M. In the apparatus of FIGS. 14 and 16, dressing can be always performed in parallel with machining of the workpiece M, while in the apparatus of FIG. 15 it is possible to freely select timing for dressing during machining of the workpiece M.

(E) Machining Process

The rotating grindstone 1 is pressed onto the workpiece M. On the other hand, the dressing electrode 6 or 61 is placed to be close to the grindstone. Then, working liquid is jetted into the spaces between the grindstone and dressing electrode and between the grindstone and the workpiece. Simultaneously, the workpiece M is machined while applying a voltage between the grindstone and the electrode from the dressing power source 7 or the common power source 11 for dressing and machining. In this case, electrolytic grinding, electric discharge grinding and mechanical grinding have a synergistic effect upon the grindstone, or electrolytic grinding and electric discharge grinding have a synergistic effect upon the grindstone.

On the other hand, there are two types of machining a workpiece. In one type, the workpiece is mechanically machined without conducting any electric current between the grindstone and the workpiece, and this type is called "purely mechanical machining". In the other type, the workpiece is machined by a combination of electrical grinding, electrochemical grinding and mechanical grinding while conducting electric current between the grindstone and the workpiece, and this type is called "composite machining". The dressing method of this invention is particularly useful for the composite machining.

The composite machining is further classified into two types, one type using an entirely conductive grindstone and the other type using a partially conductive grindstone. In either type, smoothed D.C. wave, sine wave, rectangular wave, pulsed wave, saw toothed wave, distorted wave, or a composite wave of two or more of the waves mentioned above can be used for a working voltage. A pulsed wave is particularly effective for the entirely conductive grindstone, and a smoothed D.C. wave or a composite wave of smoothed D.C. wave and pulsed wave is useful for the partially conductive grindstone. In either case, it is desirable to make the average voltage positive at the side of the workpiece.

(F) Principle of Machining

In one type of machining, a workpiece is machined while conducting electric current between a grindstone and the workpiece. In another type of machining, a workpiece is machined without conducting any electric current between a grindstone and the workpiece. The principles of these type machining are as follows:

Firstly, in the latter type machining, machining is made only by mechanical grinding.

On the other hand, in the former type machining, even if any type of grindstone 1 as described above is used, the following phenomena are caused during machining of the workpiece.

(1) Electric Discharge Effect

Just before or just after conducting an electric current between the workpiece M and the grindstone 1, electric discharge is generated between the workpiece M and the grindstone 1. The surface of the workpiece M is melted due to this discharge, and simultaneously the melted portion is blown away due to impact of discharge.

(2) Electrolytic Effect

When an electrolyte is supplied to between a workpiece M and a grindstone and an electric current flows between the workpiece M and the grindstone, the surface of the workpiece M to be machined is melted due to electrolysis.

(3) Mechanical Effect

When the abrasive zone of the grindstone 1 passes through the surface of the workpiece being melted due to discharge or electrolysis, the grains of the grindstone scratches off the portions melted due to discharge or the electrolytic products from the surface of the workpiece. Therefore, since the surface of the workpiece is cleaned by such scratching off, next discharge and electrolysis can have an extremely superior effect on the cleaned surface of the workpiece. In this manner, electrolytic, discharge and mechanical grindings synergistically act on the workpiece, thereby resulting in very easily grinding or cutting the workpiece M. However, in such machining, the phenomenon is inevitable that shavings of the workpiece M adhere between the grains of the grindstone.

(G) Dressing Process

A dressing process carried out simultaneously with machining mentioned above will be described in detail.

Firstly, while machining the workpiece M, the dressing electrode 6 or 61 is placed to be close to the peripheral surface of the rotating grindstone, a desired working liquid is fed to the adjacent area of the peripheral surface of the grindstone and the dressing electrode, and the power source for dressing is turned on. Then, if the dressing electrode is made to approach the grindstone, discharge and/or electrolysis dressing are caused between the dressing electrode and the grindstone. These phenomena synergistically act on the grindstone, and as a result of that, the shavings of the workpiece M which have adhered to the peripheral surface of the grindstone can be completely removed therefrom and thus the dressing of the grindstone can be made. This makes it possible to machine the workpiece M under the best condition.

Figure 7:
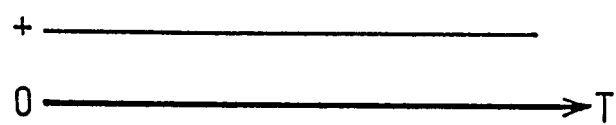
FIGS. 7 to 11 show voltage waveforms applied for dressing.
Figure 8:
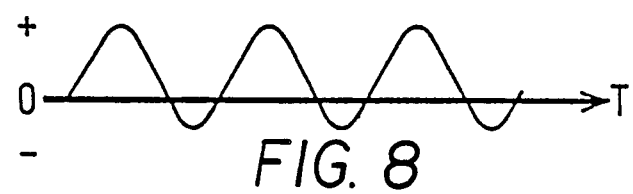
Figure 9:
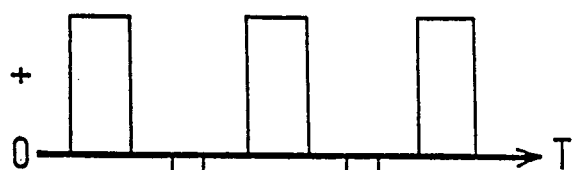
Figure 10:
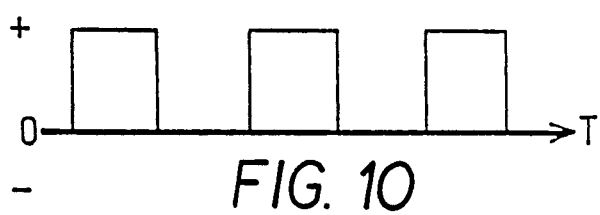
Figure 11:
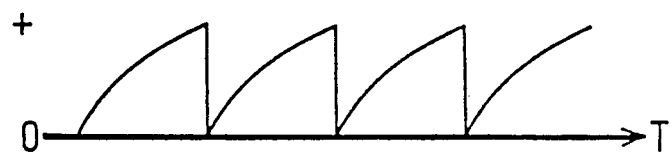

A smoothed D.C. wave (FIG. 7), a sine wave (FIG. 8), a rectangular wave (FIGS. 9 and 10), a sawtoothed wave (FIG. 11), a pulsed wave, a distorted wave (an A.C. wave containing a high frequency wave) or a composite wave of two or more of the waves mentioned above can be used for a dressing voltage (or current) to be applied to the electrode 6. In either case, it is desirable to make the average voltage positive at the side of the grindstone.

(H) Dressing Action

The dressing action on the grindstone will be described.

(1) Dressing Action due to Discharge

The substances adhered between the grains of the grindstone (the substances may be the binder material of the grindstone, depending on dressing conditions) are melted due to discharge. The melted substances are blown away from the surface of the grindstone 1 owing to the impact of discharge and the pressure of electrolyte.

(2) Dressing Action due to Electrolysis

The substances adhered between the grains of the grindstone (the substances may be the binder material of the grindstone, depending on dressing conditions) can be electrochemically melted due to electrolysis.

(3) Dressing Action due to Mechanical Grinding

If the electrodes 6 and 61 have a high wear-resistance, the shavings of the workpiece, the melted substances and products due to discharge and electrolysis and the grains and binder of the grindstone adhered between the grains of the grindstone can be scraped off due to mechanical grinding by the electrode 6 or 61.

When the dressing electrode is placed close to the peripheral surface of the grindstone 1, the dressing can be made by any one of both of electrolytic action and discharging action.

EFFECT OF THE INVENTION

As described above, in a method according to this invention, a block-like or disk-like dressing electrode is placed to be close to the peripheral surface of a grindstone for machining, and electric conduction between the electrode and the grindstone is established.

Therefore, the following technical advantages are considered to be obtained:

(A) Separately from machining operation, discharge and electrolytic melting and mechanical grinding synergistically act on the grindstone. As a result, it is possible to perform a good dressing simultaneously with machining of the workpiece, thereby resulting in a higher machining efficiency compared with prior art.

(B) Since the grindstone is dressed while machining the workpiece, foreign substances can be prevented from entering between the grains of the grindstone and thus the grindstone can always contact with the workpiece under the best condition that their grains have a sharp tip. Therefore, any excessive working force can be prevented from being applied to the workpiece, which makes it possible to machine the workpiece without producing any distortions and minute defects in the surface of the workpiece.

(C) Particularly, in the case that the workpiece is machined by a composite action of electrolysis discharging and mechanical grinding, the dressing is more effective because the best conditions for discharging and electrolysis can be always maintained during machining.

(D) In conventional dressing, the grains and the substances adhered between the grains of the grindstone are scraped off only by mechanical grinding. On the contrary, according to the method of this invention, even if the mechanical grinding would have almost no effect on the grindstone, the dressing of the grindstone can be sufficiently accomplished by the other two actions, electrolytic action and discharging action. Therefore, the method of this invention can cause less wear of the grindstone and prolong the life of the grindstone, compared with prior dressing process of mechanically scraping off the grains.

(E) According to the method of this invention, sufficient dressing can be accomplished only by slightly grinding the grindstone. Therefore, in the method of this invention, it is not necessary to use any expensive grindstone employing expensive diamond particles, cubic boron nitride or the like, but it is possible to use any inexpensive grindstone commercially available.

We claim:

1. A machining method of cutting or grinding a work piece by use of a rotating partially conductive disc grindstone and dressing the grindstone, comprising the steps of:
   (a) providing a disc grindstone for machining formed by a non-conductive grinding disc having a conductive element exposed at portions of the peripheral surface of the non-conductive grinding disc;
   (b) providing an electrode comprising a disc-like partially conductive grindstone close to the peripheral surface of said disc grindstone for machining and spaced therefrom; and
   (c) applying a dressing voltage between said electrode and said grindstone for machining while supplying a working liquid directly to a space between said electrode and said grindstone, dressing of said grindstone being accomplished by a process of at least one of electrical discharge and electrolytic melting, simultaneously with machining of said work piece by said grindstone.

2. A machining method as defined in claim 1 wherein for dressing a smoothed D.C. voltage is applied between said electrode and said grindstone for machining.

3. A machining method as defined in claim 1 wherein for dressing an intermittent voltage is applied between said electrode and said grindstone for machining.

4. A machining method as defined in claim 1 wherein for dressing a smoothed D.C. voltage and an intermittent voltage are simultaneously applied between said electrode and said grindstone for machining.

5. A machining apparatus for cutting or grinding a work piece by use of a partially conductive grindstone and for dressing the grindstone comprising:
   a rotating partially conductive disc grindstone for machining a work piece formed by a non-conductive grindstone disc having a conductive element exposed at portions of the peripheral surface of the non-conductive grindstone disc, a dressing electrode comprising a disc-like partially conductive grindstone provided close to the peripheral surface of said partially conductive disc grindstone for machining, means for supplying a working liquid to a space between said dressing electrode and said grindstone for machining, and a power source for applying a dressing voltage between said electrode and said machining grindstone such that dressing of said grindstone is accomplished, simultaneously with machining said workpiece by said grindstone, by a process of at least one of electrical discharge and electrolytic melting.

6. A machining apparatus as defined in claim 5 wherein for dressing a smoothed D.C. voltage is applied between said electrode and said grindstone for machining 7. A machining apparatus as defined in claim 5 wherein for dressing an intermittent voltage is applied between said electrode and said grindstone for machining.

8. A machining apparatus as defined in claim 5 wherein for dressing a smoothed D.C. voltage and an intermittent voltage are applied between said electrode and said grindstone for machining.

* * * * *